United States Patent
Thörn et al.

(10) Patent No.: US 9,674,883 B2
(45) Date of Patent: Jun. 6, 2017

(54) SYSTEM, AN OBJECT AND A METHOD FOR GROUPING OF OBJECTS IN A BODY AREA NETWORK

(71) Applicant: Sony Corporation, Tokyo (JP)

(72) Inventors: Ola Thörn, Limhamn (SE); Magnus Midholt, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/470,007

(22) Filed: Aug. 27, 2014

(65) Prior Publication Data

US 2016/0029422 A1  Jan. 28, 2016

(30) Foreign Application Priority Data

Jul. 23, 2014  (EP) .................................... 14178166

(51) Int. Cl.
H04B 7/24 (2006.01)
H04W 76/02 (2009.01)
H04B 13/00 (2006.01)

(52) U.S. Cl.
CPC ........ *H04W 76/023* (2013.01); *H04B 13/005* (2013.01); *H04W 76/021* (2013.01)

(58) Field of Classification Search
CPC .............................. H04W 52/24; H04W 16/14
USPC .......................................................... 455/39
See application file for complete search history.

(56) References Cited

U.S. PATENT DOCUMENTS

| | | |
|---|---|---|
| 6,580,356 B1 | 6/2003 | Alt et al. |
| 7,202,773 B1 | 4/2007 | Oba et al. |
| 2005/0008148 A1 | 1/2005 | Jacobson |
| 2005/0243061 A1 | 11/2005 | Liberty et al. |
| 2007/0145119 A1 | 6/2007 | Rhelimi |
| 2007/0282783 A1 | 12/2007 | Singh |
| 2009/0031258 A1 | 1/2009 | Arrasvuori et al. |
| 2009/0094681 A1 | 4/2009 | Sadler et al. |
| 2009/0146831 A1* | 6/2009 | Mergen ................ H04B 13/005 340/8.1 |
| 2010/0070758 A1* | 3/2010 | Low ........................ H04W 4/08 713/155 |
| 2010/0248692 A1 | 9/2010 | Keller et al. |

(Continued)

FOREIGN PATENT DOCUMENTS

| | | |
|---|---|---|
| EP | 1220501 | 7/2002 |
| EP | 2018038 | 1/2009 |

(Continued)

OTHER PUBLICATIONS

Bionym, "The Nymi White Paper", Nov. 19, 2013.

(Continued)

*Primary Examiner* — Wesley Kim
*Assistant Examiner* — Raj Chakraborty
(74) *Attorney, Agent, or Firm* — Renner, Otto, Boisselle & Sklar, LLP.

(57) ABSTRACT

A method, performed in a Body Area Network (BAN) enabled communication device, for grouping of at least one BAN enabled object. A connection between at least one BAN enabled object and the BAN enabled communication device is created by using BAN and grouping of the at least one BAN enabled object and the BAN enabled communication device is initiated by creating a group of the at least one BAN enabled object.

14 Claims, 7 Drawing Sheets

(56) References Cited

U.S. PATENT DOCUMENTS

| | | |
|---|---|---|
| 2010/0277435 A1 | 11/2010 | Han et al. |
| 2011/0078445 A1* | 3/2011 | Xiao .................... H04L 63/105 |
| | | 713/171 |
| 2011/0205156 A1 | 8/2011 | Gomez et al. |
| 2012/0026129 A1 | 2/2012 | Kawakami |
| 2012/0249409 A1 | 10/2012 | Toney et al. |
| 2012/0324368 A1 | 12/2012 | Putz et al. |
| 2013/0017789 A1 | 1/2013 | Chi et al. |
| 2013/0174049 A1 | 7/2013 | Townsend et al. |
| 2014/0085050 A1 | 3/2014 | Luna |
| 2015/0181430 A1* | 6/2015 | Lee ........................ G06F 21/32 |
| | | 726/5 |

FOREIGN PATENT DOCUMENTS

| | | |
|---|---|---|
| EP | 2378748 | 10/2011 |
| EP | 2600319 | 6/2013 |
| JP | 2008 073462 | 4/2008 |
| JP | 2009 049951 | 3/2009 |
| WO | 2011/021531 | 2/2011 |

OTHER PUBLICATIONS

International Search Report and Written Opinion dated May 5, 2015 for corresponding International application No. PCT/IB2015/051453.

* cited by examiner

SYSTEM, AN OBJECT AND A METHOD FOR GROUPING OF OBJECTS IN A BODY AREA NETWORK

TECHNICAL FIELD

The present invention relates to a system, an object and a method for data transfer close to a person's body, which object is a portable electronic communication object adapted for both wireless and Body Coupled Communication, BCC, with at least one further portable electronic communication object creating a system in a Body Area Network, BAN. Specially, the invention relates to a BAN enabled portable electronic communication object and a method for grouping of said BAN enabled portable electronic communication objects.

BACKGROUND ART

We are living in a world where we own more and more internet enabled objects and devices, such as wristlets, keys, lamps, books, tools etc. which we need to be able to keep track of.

Approaching a world where everything is internet enabled, we will get a need for group and sort things, like we do with all our things, to keep track of them. This will be apparent for basic use cases, such as configure all lights in a room such that they work together. In more advanced use cases, such as configure what items belong in each room, such as this object belongs in the kitchen and this object belongs in the living room. In a detailed use case, such as sorting small pieces in a game, like chess pieces, money in a monopole game or cards in a poker game Conventional internet enabled devices are generally connected by being wired to each other or is connected by utilizing different kinds of short range wireless solutions, also referred to as Personal Area Network, PAN using radio-frequency (RF) techniques such as Bluetooth©, infrared Data association (IrDA), ZigBee ©, Ultra WideBand (UWB), etc. However, the RF-technique have some drawbacks, e.g. there might be a limited operating time due to relatively high power consumption of the RF transceiver, the risk of interference with other RF systems operating in the same frequency band, and the user is exposed to potentially harmful RF radiation. Moreover, the user needs to manually pair the internet enabled devices, e.g. a wristlet with a mobile phone, in order to establish a RF connection between them.

There is a need for faster, easier and more intuitive ways of pairing or grouping internet enabled objects by means of easy and convenient methods. Moreover, there is a need to guarantee that a specific object is connected to a specific electronic communication device. In other words, it is important to ensure that a user's electronic communication device establish a connection with the right object.

SUMMARY OF THE INVENTION

An object of the present disclosure is to provide a solution which seeks to mitigate, alleviate, or eliminate one or more of the above and below identified deficiencies in the art and disadvantages singly or in any combination.

The invention concerns a method, performed in a Body Area Network, BAN, enabled communication device, for grouping of at least one BAN enabled object. The method comprising the steps of establishing a connection between at least one BAN enabled object and the BAN enabled communication device by using BAN, receiving a requested objectID of the at least one BAN enabled object by using BAN and initiating grouping of the at least one BAN enabled object by creating group identification data, groupID, based on the received objectID of the at least one BAN enabled object. An advantage of the method is that a BAN connection can be created between several BAN enabled devices in a fast, easy and intuitive ways and create a groups of these BAN enabled devices.

In one aspect of the invention the method further comprises the step of sending a request for identification data, objectID, of at least one object by using BAN.

In one aspect of the invention the further comprises the step of confirming the grouping of the at least one object by sending the created groupID data to the at least one BAN enabled object. In one aspect of the invention the method further comprises the step of storing the groupID within the communication device. In one aspect the step of receiving the objectID further comprises the step of receiving and adding further data of the at least one object. In one aspect the further data comprises position data or property data of the at least one object.

In one aspect the method further comprises the step of tracing the at least one object by using the groupID.

This disclosure further relates to a method performed in a Body Area Network, BAN, enabled object, associated with a BAN enabled communication device, for grouping of the object, the method comprises the steps of establishing a connection between the object and the communication device by using BAN, sending identification data, objectID, of the object to the communication device by using a communication interface of the object by using BAN and receiving groupID from said communication device confirming grouping of the object and the communication device by using BAN.

In one aspect the method further comprises the step of storing received groupID in a storing unit of the object.

In one aspect the step of sending the objectID to the communication device further comprises the step of sending further data of the object. In one aspect the further data comprises position data of the object. In one aspect the further data comprises property data of the object.

The disclosure further relates to a Body Area Network, BAN, enabled object, configured for being grouped with at least one further BAN enabled object, wherein the BAN enabled object comprises a detector unit configured for detecting the presence of a human body, a radio communication interface configured to communicate with a BAN enabled communication device. The BAN enabled object further comprises a processing circuitry configured to broadcast a signal, indicating an ability to group, when the detector unit detects the presence of a human body, transmit identification data, objectID, associated with the BAN enabled object to the BAN enabled communication device, when a request for objectID is received, receive, using the radio communication interface, groupID from the communication device, when a groupID is created, store, in a data storage, the received groupID.

In one aspect of the invention the processing circuitry is further configured to transmit position data to the communication device.

In one aspect of the invention the processing circuitry is further configured to transmit property data to the communication device.

In one aspect of the invention the BAN enabled object comprises an electronic module.

In one aspect of the invention the electronic module comprises the detector unit, the radio communication unit, the processing circuitry and the data storage.

In one aspect of the invention the electronic module further comprises a battery.

The disclosure further relates to a system comprising at least one Body Area Network, BAN, enabled object and a Body Area Network, BAN, enabled communication device, wherein the system is configured for grouping of the at least one BAN enabled object with the BAN enabled communication device, wherein the BAN enabled object comprises a detector unit configured for detecting the presence of a human body, a radio communication interface configured to communicate with said BAN enabled communication device and a processing circuitry. The processing circuitry is configured to send a signal, indicating an ability to group, when said detector unit detects the presence of a human body, transmit identification data, objectID, associated with the BAN enabled object to the BAN enabled communication device, when a request for objectID is received, receive, using the radio communication interface, groupID from said BAN enabled communication device, when a groupID is created and store, in a data storage, the received groupID.

The features of the above-mentioned embodiments can be combined in any combinations.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

As used herein, the term "mobile device" includes mobile communication device and mobile radio communication equipment. Portable communication devices and mobile communication devices may be used synonymously. The term "mobile device" may be referred to below as a mobile phone (or as a mobile telephone, portable phone or portable telephone), a portable device, a portable radio terminal or a portable terminal, which includes all electronic equipment, but not limited to, capable of being used for voice and/or data communication.

As will be appreciated, the invention may be used with mobile phones, other phones, smartphones, personal digital assistants (PDAs), computers, tablets, other electronic communication devices, etc., for brevity, the invention will be described by way of examples with respect to mobile phones, but it will be appreciated that the invention may be used with other electronic communication devices.

A body area network, BAN, also referred to as a wireless body area network, WBAN or body sensor network, SSN, is a wireless network of wearable communication devices. BAN enabled devices may be embedded inside the body, implants, may be surface-mounted on the body in a fixed position or may be accompanied devices which humans can carry in different positions, in clothes pockets, by hand or in various bags.

More and more devices get support for Body Area Network, BAN, defined by IEEE 802.15. The first devices have its background in the medical area, as BAN is a communication standard optimized for low power devices and operation on, in or around the human body. BAN makes it possible to communicate when normally 2 m or less between the devices over the body. Operation is in global, license-exempt band like 2.4 MHz. Peer-to-Peer, and Point to Multi-point communication can be established and it contains efficient sleep modes. Today, a maximum of 100 BAN enabled devices can be connected and there is a network density limit of 2-4 networks/m$^2$.

Figure 1:
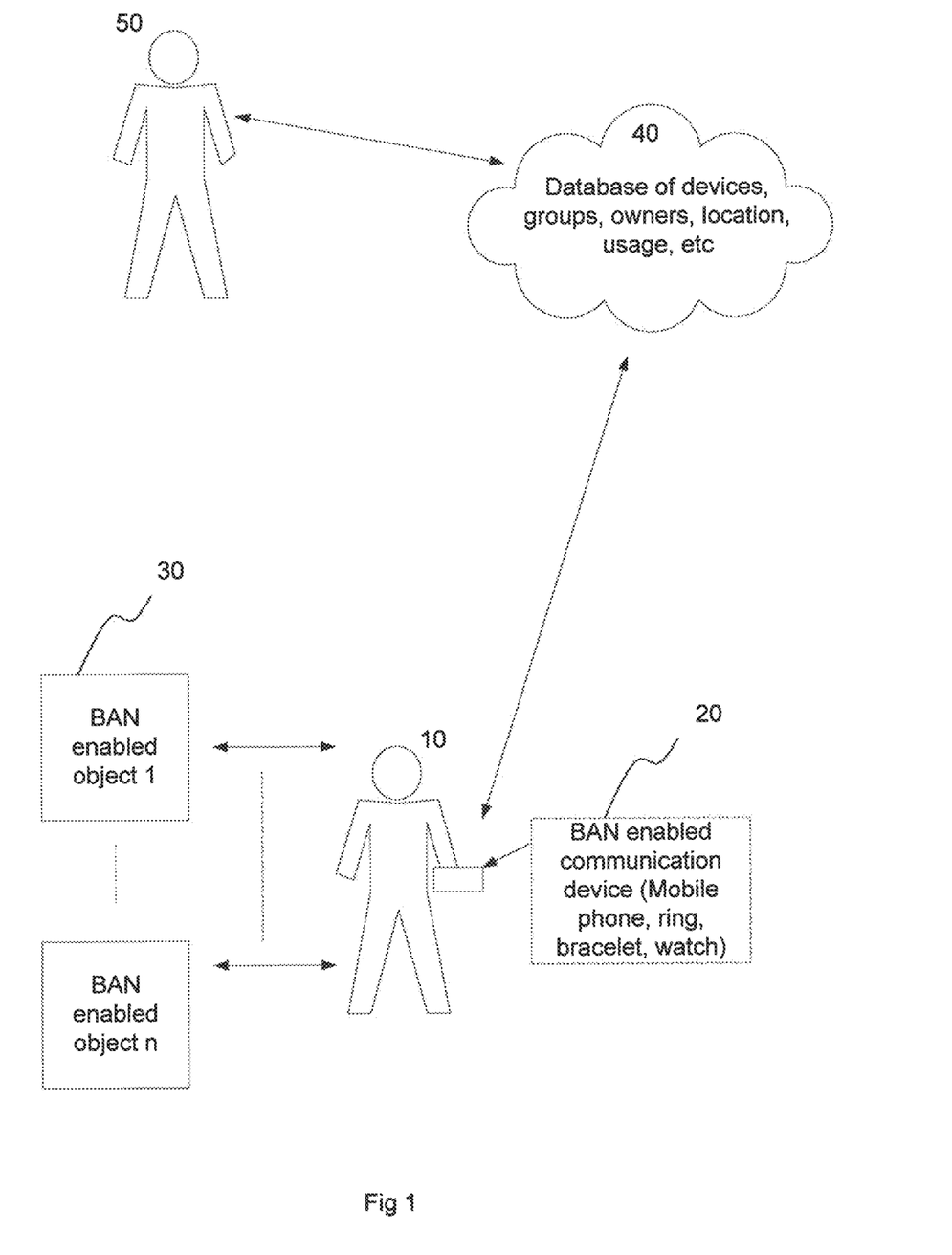
FIG. 1 shows a system comprising a BAN enabled object and a BAN enabled communication device according to the disclosure.
Figure 4:
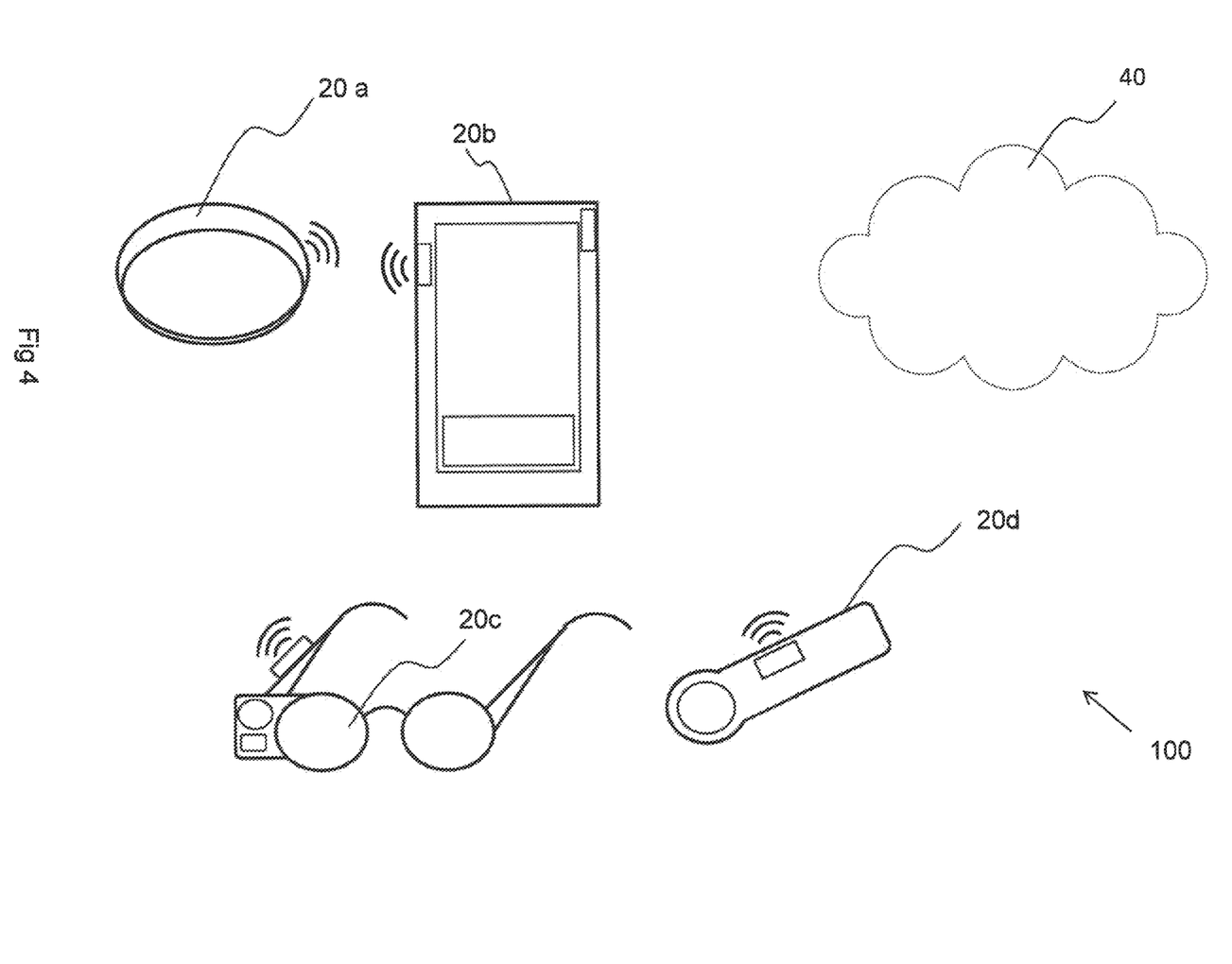
FIG. 4 shows exemplary embodiment according to the disclosure.

Referring in detail to the drawings, and initially to FIG. 1, a wearable BAN enabled communication device in accordance with an embodiment of the present invention is illustrated generally at 20, 20a, 20b, 20c, 20d. A wearable BAN enabled communication device 20, 20a, 20b, 20c, 20d in this application refers to a communication device configured to be worn by a person. Examples of such wearable BAN enabled communication devices are shown in FIG. 4, such as BAN enabled accessories i.e. a wristlet 20a, an in-ear hearing device 20d, goggles 20c or a BAN enabled mobile phone 20b. The wearable BAN enabled communication device 20, 20a, 20b, 20c, 20d will be referred to below as a BAN enabled device 20, 20a, 20b, 20c, 20d.

A BAN enabled object in accordance with an embodiment of the present invention is illustrated generally at 30. A BAN enabled object 30 in this application refers to any object equipped with a BAN electronic circuit to be touched by a user, e.g. a lamp, a key, a card, a book, a weight etc. for being connected to a BAN enabled device 20, 20a, 20b, 20c, 20d.

Figure 2:
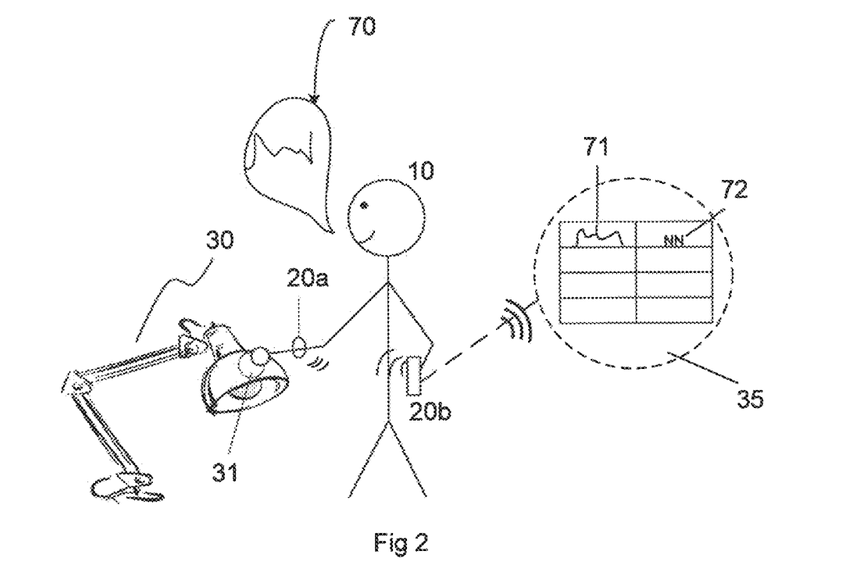
FIG. 2 illustrates a user wearing at least a first and a second BAN enabled communication device in one scenario of how the present invention can be implemented.

In one embodiment a user 10 is wearing at least two BAN enabled devices, as shown in FIG. 2, a first BAN enabled device 20a, which may be a BAN enabled accessory such as a headset, watch, bracelet or a ring, and a second BAN enabled device 20b, which may be a mobile phone. A BAN connection is created between the BAN enabled accessory 20a and the mobile phone 20b, where the mobile phone communicates a user ID, IP/session ID, login etc., as security key data, userID, to the BAN enabled accessory 20a over the BAN.

Figure 3:
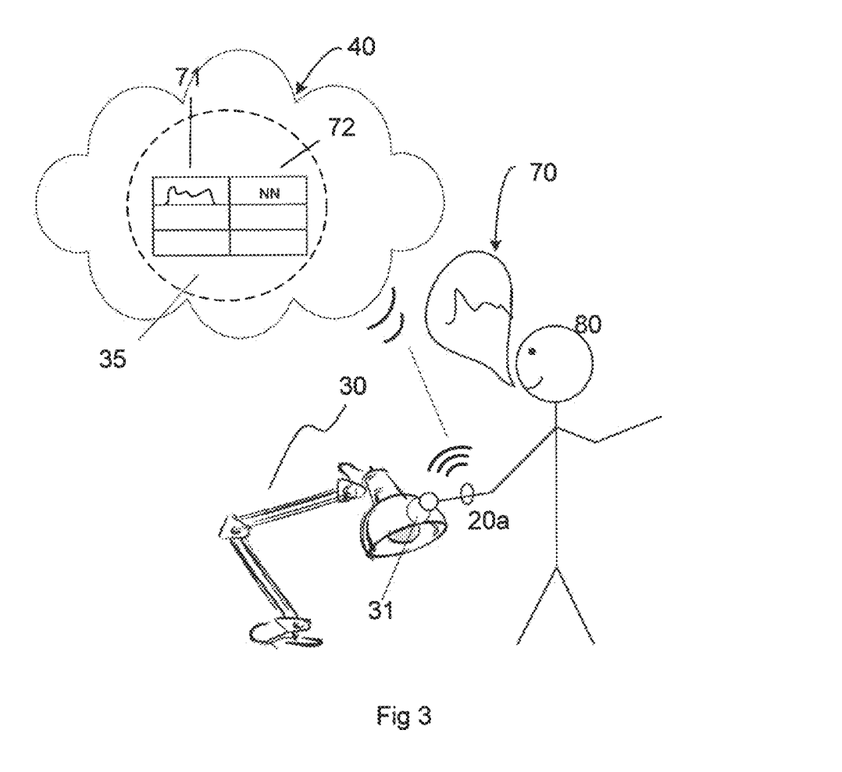
FIG. 3 illustrates a user wearing one BAN enabled communication device in one scenario of how the present invention can be implemented.

In one embodiment a user is wearing a BAN enabled device 20a, as shown in FIG. 3, which may be a BAN enabled accessory or a BAN enabled mobile phone. The BAN enabled device 20a can also contain additional communication channels, like Bluetooth Low Energy (BLE), WiFi, etc. to be able to setup a direct connection towards a cloud service 40, as shown in FIG. 1.

In one embodiment a group may be created by touching at least one BAN enabled object 30, e.g. a lamp, by a user 10, 80. A tremor signal, indicating the presence of a human body, the user, is detected by a detector unit provided in, on or at the BAN enabled object, thus confirming that there is a BAN available. Since the lamp is BAN enabled it will connect to the BAN enabled mobile phone 20b directly or via the BAN enabled accessory 20a by using BAN. The objects connect by sending an objectID to the BAN enabled device 20a, 20b. The BAN enabled device 20a, 20b groups the object by creating a groupID. If the user touched more than one BAN enabled object at the same time or after each other, they may be added to the same group with the same groupID if the user confirms that they should be grouped. The user may be asked by the BAN enabled device 20a, 20b through a user interface of the BAN enabled device or by interacting with the BAN enabled device in some other way, such as pressing a button, touching a touchpad etc.

The method will now be described starting from FIG. 2 disclosing method steps, performed in a wearable BAN enabled communication device 20, such as a ring, bracelet, watch, tag, mobile phone, tablet, pad, which may be connected to another wearable BAN enabled communication device or may be connected to a cloud service through BAN, BLE, WiFi, for grouping of at least one BAN enabled object 30, an object with a BAN tag to be touched. When the described steps are not dependent on each other, these steps may be implemented in any combination.

In the first step the wearable BAN enabled communication device 20a, e.g. a wearable device, establish a connection S1 between a BAN enabled object 30 and said communication device when detecting the presence of a human body by using BAN.

In one aspect UserID is sent through BAN to object 30 when object being touched by the user such as closing hand/foot and/or shaking hand/foot/head)

In the second step the wearable device sends a request S2 for identification data, objectID, to the object by using BAN.

In the third step the wearable device receives S3 the requested objectID from the object by using BAN.

In the fourth step the wearable device initiate grouping S4 of the at least one object by creating group identification data, groupID, based on the received objectID of the at least one object.

In the fifth step the wearable device confirms grouping S5 of the at least one object by sending the created groupID data to the at least one object.

According to one aspect the step of initiating grouping S4 comprises storing S41 the created groupID within said wearable device or externally, thus in a location outside the wearable device, e.g. in a database or in service cloud 40.

According to one aspect the step of receiving the requested objectID S3 comprises the step of receiving and adding S31 further data or information associated with the at least one object within a created group.

In one aspect further data or information is position, location or area data of the BAN enabled object. Position, location or area data may comprises information of where the object belongs such as in the kitchen, at day-care, at the gym, in a group of cards, etc. Position/location data may comprise geographical data such as what latitude, what longitude, which location fence, which is used in fencing technology.

In one aspect further data or information is property data of the BAN enabled object. Property data may comprise information such as equipment information, such as in the kitchen e.g. knife, fork, spoon, at day-care e.g. boy at the age of 5, in the gym e.g. 10 kg weight, in a group of card e.g. king of heart. The property data may comprise information such as design information e.g. colour, length, material, manufacturer, type of device etc.

As an example, the user may add further property data or location data to an objectID of an object that is already grouped. The associated groupID may then be updated as soon as the associated communication device is within the same BAN as the updated object. As an example, the user decides to move a lamp in the living room, thus the location information changes. The objectID is changed automatically or manually by the user and the groupID will also be updated as soon as the grouped communication device and object is within the same BAN.

In one embodiment the method further comprises the step of tracing the at least one object by using the groupID.

The method will now be described starting from FIG. 3 disclosing method steps, performed in a Body Area Network, BAN, enabled object 30, associated with a BAN enabled communication device 20, for grouping of the object 30. When the described steps are not dependent on each other, these steps may be implemented in any combination.

In the first step the BAN enabled object 30 establish a connection S10 between said object and said communication device 20 when detecting the presence of a human body by using a detecting unit of said object by using BAN.

In the second step the BAN enabled object sends S11 identification data, objectID, of said object to said communication device by using a communication interface of the object by using BAN.

In the third step the BAN enabled object 30 receives a groupID from the communication device by using BAN confirming grouping of the object 30 and the communication device 20.

In one embodiment the BAN enabled object 30 stores S12 the received groupID data in a storage unit of the object.

In one embodiment the step of sending the requested objectID S11 comprises the step of sending S111 further data or information associated with the at least one object.

In one aspect further data or information is position or location data or information of the object. Position/location data may comprises information of where the object belongs such as in the kitchen, at day-care, at the gym, in a group of cards, etc. Position/location data may comprise geographical data such as what latitude, what longitude, which location fence, which is used in fencing technology.

In one aspect further data or information is property data of the object. Property data may comprise information such as equipment information, such as in the kitchen e.g. knife, fork, spoon, at day-care e.g. boy at the age of 5, in the gym e.g. 10 kg weight, in a group of card e.g. king of heart. The property data may comprise information such as design information e.g. colour, length, material, manufacturer etc.

Figure 5:
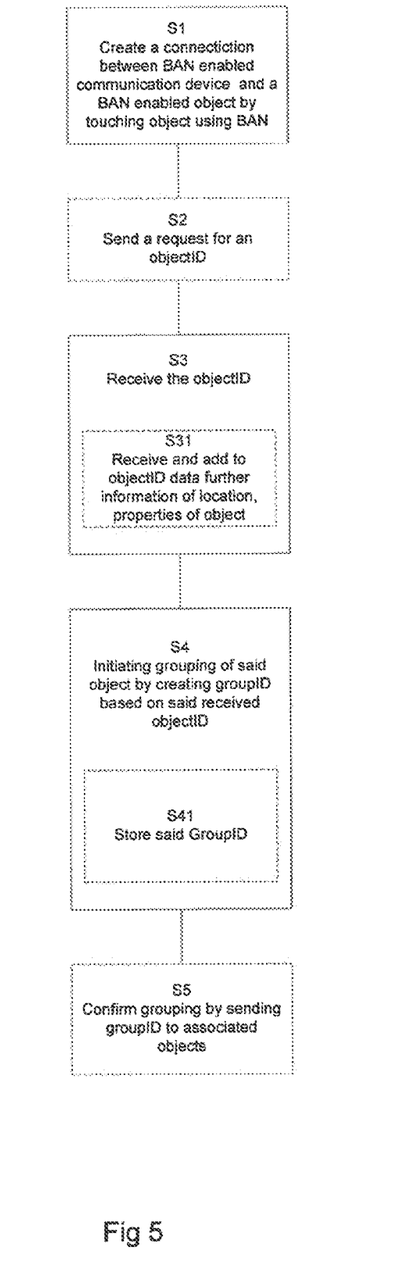
FIG. 5 shows a flow chart of the method performed in a BAN enabled communication device according to the disclosure.
Figure 6:
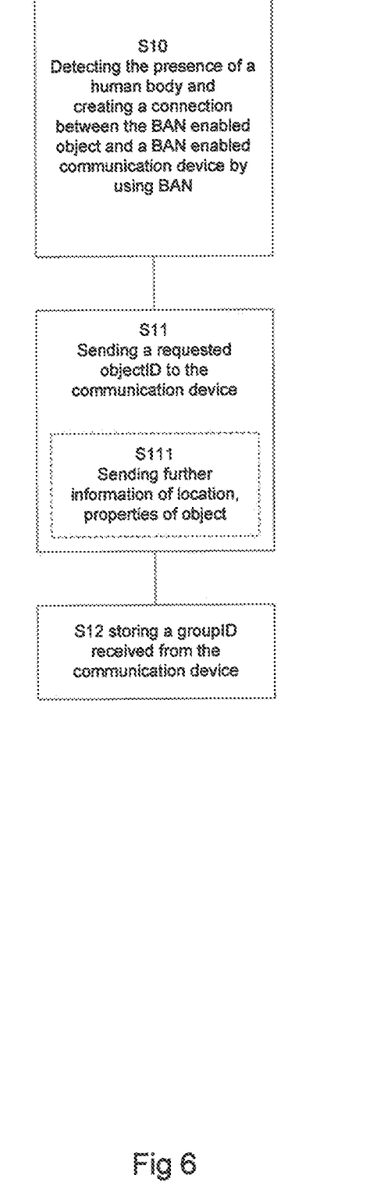
FIG. 6 shows a flow chart of the method performed in a BAN enabled object according to the disclosure.

FIG. 5 show a system 100 comprising a Body Area Network, BAN, enabled object 30, associated and a BAN enabled communication device 20, which will now be described in further detail, configured for grouping of at least one BAN enabled object with the BAN enabled communication device, where the method is implemented.

Figure 7:
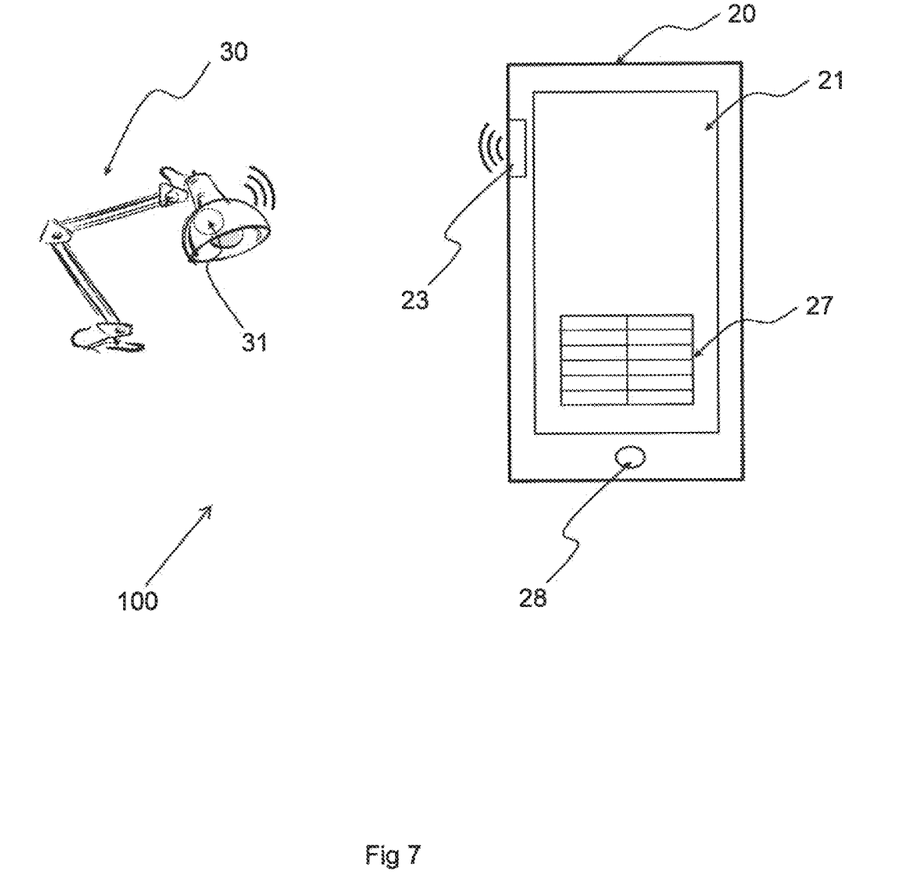
FIG. 7 shows a system comprising a BAN enabled object and a BAN enabled communication device according to the disclosure.
Figure 8:
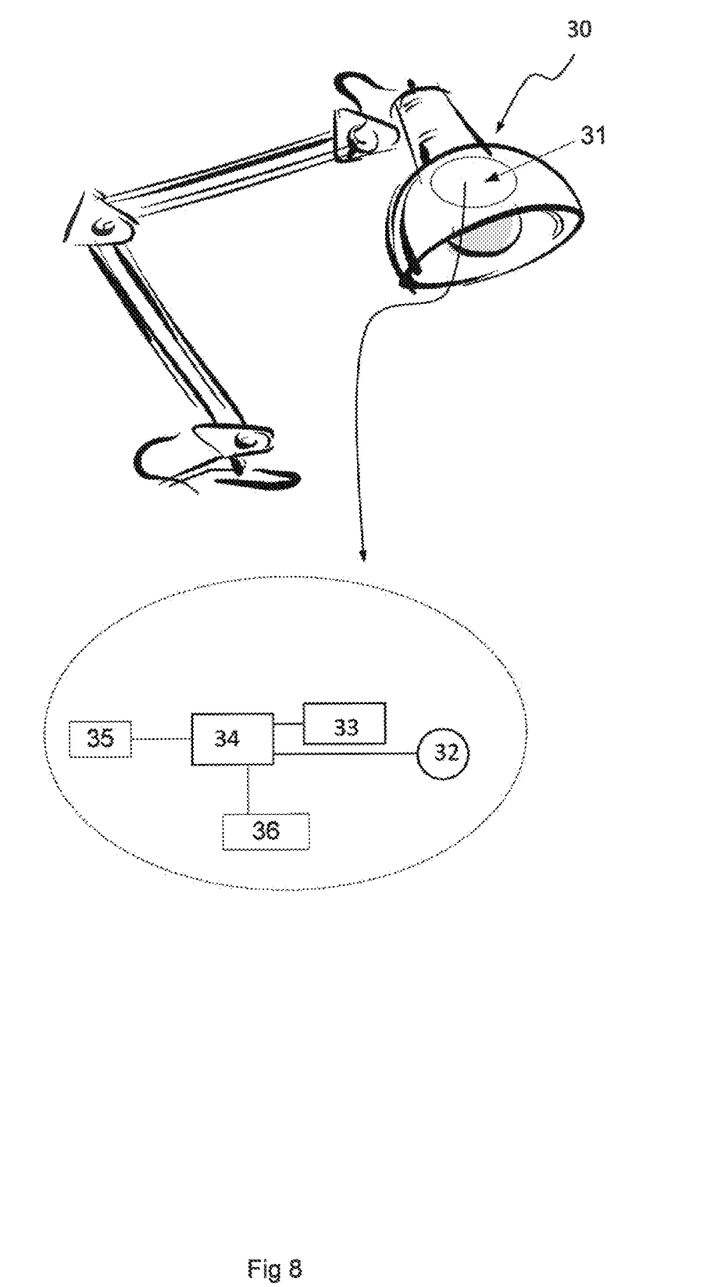
FIG. 8 shows a BAN enabled object according to the disclosure.

FIGS. 7 and 8 show a Body Area Network, BAN, enabled object 30, associated with a communication device 20, which will now be described in further detail, configured for being grouped with at least one second BAN enabled, where the method is implemented. The BAN enabled object may be any object and a lamp is shown in FIG. 5 only as an exemplary object. The BAN enabled object is equipped with a BAN electronic module 31. The electronic module 31 may be designed as tag to be permanently attached to the object or to be removed from the object 30 and put on another object. The BAN electronic module 31 can also be designed a patch or any adhesive or sticking piece of paper or plastic.

FIG. 8 shows the BAN electronic module 31 as a hatched area. The BAN electronic module comprises a detector unit 32 configured for detecting a tremor signal that indicates the presence of a human body. The detector unit can be a sensor of any kind such as an accelerator, optical sensor, temperature sensor, pulse sensor or the like.

In one embodiment the detector unit comprises a capacitive touch system. The capacitive sensor system has low power consumption, which is less than 30 micro Amperes, when the electronic module is touched. The sensitive range may be set to the range of 20-30 mm. The capacitive sensor system is always active. As soon as the user touches the BAN electronic module the detector unit starts to sense the presence of a human body.

In one embodiment, the detector unit comprises an accelerometer, which can detect a tremor signal from the user. A tremor signal is a signal indicating the human quiver or tremble movement and the tremor signal is always present in human muscles at a frequency of 8-12 Hz.

In one embodiment, the detector unit comprises a pulse sensor, which can detect the heart rate or blood pulse of the user.

In one embodiment, the detector unit comprises a temperature sensor, which can detect the temperature of the skin of the user.

In one embodiment, the detector unit comprises an optical sensor, which can detect the temperature of the skin of the user.

The electronic module 31 further comprises a radio communication interface 33 configured to communicate with a BAN enabled communication device 20 by using BAN.

The electronic module 31 further comprises a data storage 35 configured to store the received groupID.

The electronic module further comprises a controller 34. The controller is configured to execute the method according to the disclosure. The controller is typically a processing circuitry 34 configured for executing computer code, such as a computer program implementing the proposed method. One example is that the computer code is an application, which may be downloaded from an external server. However, the method may as well be hardware implemented or a combination of hardware and software. The controller 34 is configured to broadcast a signal, indicating ability to group, when said detector unit 32 detects the presence of a human body. The controller 34 is configured to transmit identification data, objectID, associated with the object 30 to the communication device 20, when a request for objectID is received. Further the controller is configured to receive, using the radio communication interface 33, groupID from said communication device 20, when a group is created. The controller 34 is configured to store, in the data storage 35, the received groupID.

In one aspect the controller 34 is further configured to transmit position data to the communication device 20.

In one aspect the controller 34 is further configured to transmit property data to the communication device 20.

In one aspect the BAN enabled object further comprises a battery 36. The battery may be positioned in the electronic module or at any other position on the object.

FIGS. 1, 2, 3 and 7 shows a BAN enabled communication device, which now will be described in further detail. The BAN enabled communication device may be a BAN enabled accessory 20a, 20d or a mobile device.

In one embodiment the BAN enabled communication device is a mobile device, as shown in FIGS. 2, 3 and 7, e.g. a mobile phone. The mobile phone 20 comprises a controller, DTL, or a processing circuitry 22 that may be constituted by any suitable Central Processing Unit, CPU, microcontroller, Digital Signal Processor, DPS, etc. capable of executing computer program code for executing the method disclosed. However, the method may as well be hardware implemented or a combination of hardware and software. The computer program may be stored in a memory, MEM, not shown. The memory can be any combination of a Read and Write memory, RAM, and a Read only Memory, ROM. The memory may also comprise persistent storage, which for example, can be any single one or combination of magnetic memory, optical memory, or solid state memory or even remotely mounted memory.

The mobile phone 20 further comprises a wireless communication interface (i/f) 23 arranged for wireless communication with cellular communication systems and/or other wireless communication systems. The wireless communication interface may be adapted to communicate over one or several radio access technologies. If several technologies are supported, the access point typically comprises several communication interfaces, e.g. one WLAN communication interface and one cellular communication interface. The communication interface is e.g. adapted to download a computer program for executing the proposed methods or access a data base comprising device specific information.

The mobile phone further comprises an input unit 27, such as a keyboard, microphone 28 and a display unit 21.

The electronic module further comprises a controller 34. The controller is configured to execute the method according to the disclosure. The controller is typically a processing circuitry 34 configured for executing computer code, such as a computer program implementing the proposed method. One example is that the computer code is an application, which may be downloaded from an external server. However, the method may as well be hardware implemented or a combination of hardware and software. The controller 34 is configured to broadcast a signal, indicating ability to group, when said detector unit 32 detects the presence of a human body. The controller 34 is configured to transmit identification data, objectID, associated with the object 30 to the communication device 20, when a request for objectID is received. Further the controller is configured to receive, using the radio communication interface 33, groupID from said communication device 20, when a group is created. The controller 34 is configured to store, in the data storage 35, the received groupID.

In one aspect the controller 34 is further configured to transmit position data to the communication device 20.

In one aspect the controller 34 is further configured to transmit property data to the communication device 20.

In one aspect the BAN enabled object further comprises a battery 36. The battery may be positioned in the electronic module or at any other position on the object.

In one embodiment the BAN enabled communication device is a BAN enabled accessory, as shown in FIGS. 2 and 4. The BAN enabled accessory comprises a detector unit, a controller unit and a communication unit, not shown. The detector unit is configured for detecting a tremor signal that indicates the presence of a human body and movement of a body part. The communication unit is configured to communicate with a BAN enabled communication device by using BAN. The BAN enabled accessory further comprises data storage, not shown, configured to store the received groupID.

In one embodiment a group is created by holding at least one BAN enabled object, e.g. keys, in one hand of the user. A tremor signal, indicating the presence of a human body, the user, is detected by the detector unit 32 provided in, on or at the BAN enabled objects, thus confirming that there is a BAN available. Since the objects are BAN enabled they will connect by using BAN. To confirm it is a group a confirming step S5 is performed in the form of performing an additional action. In one aspect the additional action is detecting a hand movement, which is performed by the user by e.g. closing the hand firmly, shaking the hand etc. The hand movement is detected by the detector unit or within any of the wearable devices, e.g. a bracelet or wristlet, within the BAN, with which the additional action is performed. In one aspect the user 10, 80 may create a name 72 of the group by saying it out loud 70, as shown in FIGS. 2 and 3, and the sound signal 71 is recorded by a sound detector unit 28, such as a microphone of the mobile phone, and transformed into a name 72 or the user provides it in writing using an input device 27, such as a keyboard of the mobile phone. In one aspect the user may also say or write where the object belongs, e.g. where the object is located, i.e. in a toolbox, in the kitchen etc.

In one embodiment the user uses both hands and is holding some objects in left hand and some objects in right hand. All items in both hands of the user are connected by using BAN. Tremor signal is detected by the detector unit provided in, on or at the BAN enabled objects in the hand. To confirm that the objects are a group a confirming step is performed in the form of performing an additional action. In one aspect the action is detecting a hand movement, which is performed by the user by e.g. closing the hands firmly, shaking the hand etc. The hand movement is detected by the detector unit, provided in, on or at the BAN enabled objects in the hand or within any of the wearable devices, e.g. a bracelet or wristlet, within the BAN, with which the additional action is performed. In one aspect the group confirming step includes the step where the user creates a name 72 of the group by saying it out loud and then the sound signal 71 is recorded by a sound detector unit, such as a microphone, or the user provides it in writing using an input device, such as a keyboard. In aspect the user may also say or write where the object belongs, i.e. where the object is located, i.e. in a toolbox, in the kitchen etc.

In another embodiment the user uses the foot or feet and all BAN enabled objects under the bare foot or feet of the user is connected by using BAN. The tremor signal is detected by the detector unit provided in, on or at the objects under the foot or feet or within any of the wearable devices within the BAN, e.g. a footwear bracelet. To confirm it is a group a confirming step is performed in the form of performing an additional action. In one aspect the additional action is detecting a foot or feet movement, which is performed by the user by e.g. shaking or stamping the foot or feet. The foot or feet movement is detected by the detector unit provided in, on or at the BAN enabled objects under the foot or feet or within any of the wearable devices, e.g. a footwear bracelet, within the BAN, with which the additional action is performed. In one aspect the group confirming step includes the step where the user creates a name 72 of the group by saying it out loud and then the sound signal 71 is recorded by a sound detector unit 28, such as a microphone, or the user provides it in writing using an input device 27, such as a keyboard. In aspect the user may also say or write where the object belongs.

In one embodiment the groups of BAN enabled objects are created based on who touched the BAN enabled object or objects last. In one aspect the last person to tap or touch a BAN enabled object is labelled as the owner of the object. As an example, when playing poker with your friends, where each card is BAN enabled and the player that touches a card will be grouped. Since the card is physically close to the user, the BAN connection may be used to enable real time scores e.g. who is in the lead.

In one embodiment the groups are used for sorting things in specific orders, e.g. the lamps should be lit up in a specific order or sorting thins dependent on conditional requirement e.g. if the kitchen appliances is in the same group as the lamp in the kitchen, a pre-condition could be that if the light is switched off on the room all kitchen appliance could be turned off. This will result in that power is saved when turning off the light when not in the room.

In one embodiment a cloud service 40 is tracking the use cases above to keep track of groups, groupID, and the ID of the person, userID, that used/touched the object last time or using it right now. In one aspect, everything that is touched or is touched by a user right now is registered in a database. This database could be provided with a user interface where the status of a specific BAN enabled object is displayed. All kinds of status could be registered or collected, such as when the object was used, who used the object, where is the object located, who is using the object right know etc. An application, app, could be provided for being used for keeping track of BAN enabled devices both for the user or owner, but also for other users or a supervisor 50 of all BAN enabled devices.

Some of the advantages of using grouping of BAN enabled objects may be:

To able to easily searching for BAN enabled objects by using the tracking feature, as explained above, by using the cloud service, by searching in a database or by sending a question to the user that is using the object at the moment.

To be able to clean up in a fast way. Since all BAN enabled object that belong in a specific location or room, e.g. the kitchen, is grouped and labelled with groupID you can touch a BAN enabled object and get information regarding where this object belongs. In one aspect you may be able to see, e.g. by using augmented reality lenses, that an object is misplaced, or on a map, a notification or an alarm may be sent to the user, e.g. cleaner, when something is placed in the wrong location or room, also location based services will help to map items to a location. In one aspect the time the BAN enabled device were placed in a room could be a trigger, e.g. one day unused or in a wrong position, location, area or room.

To be able to find out who misplaced the object, thus who used the object latest, e.g. who borrowed the saw, by using the tracking feature.

To be able to see who could or is using the object right now. In one aspect groups of BAN enabled objects or separate BAN enabled objects could be labelled with permissions, thus only a limited group of users could be permitted to use the object, e.g. to turn on the TV, computer or a kitchen machine.

To be able to supervise all objects within the BAN, thus a supervisor 50 could modify the permissions to use a BAN enabled object, change the groupings, etc.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method, performed in a Body Area Network (BAN) enabled communication device associated with a user, for grouping of at least one BAN enabled object, the method comprising the steps of:
    establishing a BAN connection via the body of said user between said at least one BAN enabled object and said BAN enabled communication device by sending a userID of said BAN enabled communication device to said at least one BAN enabled object when said user touches said at least one BAN enabled object;
    receiving a requested objectID and position data of said at least one BAN enabled object by using said established BAN connection, wherein the position data comprises location data indicating a user-settable intended location of the BAN enabled object;
    initiating grouping of said at least one BAN enabled object by creating a group identification data, groupID, based on said received objectID and position data of said at least one BAN enabled object;
    confirming said grouping of said at least one object by transmitting said created groupID data to said at least one BAN enabled object by using said established BAN connection; and
    storing said groupID within said communication device.

2. The method according to claim 1, wherein the method further comprising the step of:
    sending a request for identification data, objectID, of said at least one object by using said established BAN connection.

3. The method according to claim 1, wherein the step of receiving said objectID further comprising the step of:
    receiving and adding further data of said at least one object.

4. The method according to claim 3, wherein the further data comprises property data of said at least one object.

5. The method according to claim 1, wherein the method further comprises the step of:
    tracing said at least one object by using said groupID.

6. A method performed in a Body Area Network, BAN, enabled object, associated with a BAN enabled communication device, for grouping of said object, the method comprising the steps of:
    establishing a BAN connection via the body of the user between said BAN enabled object and said BAN enabled communication device receiving a userID from by said BAN enabled communication device when said user touches said BAN enabled object;
    sending identification data, objectID, and position data of said object to said communication device by using a communication interface of said object by using said established BAN connection, wherein the position data comprises location data indicating a user-settable intended location of the BAN enabled object;
    receiving groupID from said communication device confirming grouping of said object and said communication device by using said established BAN connection; and
    storing said received groupID in a storing unit of said object.

7. The method according to claim 6, wherein the step of sending said objectID further comprising the step of:
    sending further data of said object.

8. The method according to claim 7, wherein said further data comprises property data of said object.

9. A Body Area Network, BAN, enabled object configured for being grouped with at least one further BAN enabled object, wherein said BAN enabled object comprising:
    detector unit circuitry configured for detecting the presence of a human body within a prescribed distance of the detector unit circuitry;
    radio communication interface circuitry configured to communicate with a BAN enabled communication device;
    a processing circuitry configured to:
        i. broadcast a signal, indicating an ability to group, when said detector unit circuitry detects the presence of a human body;
        ii. transmit identification data, objectID, and position data associated with said BAN enabled object to said BAN enabled communication device, when a request for objectID is received, wherein the position data comprises location data indicating a user-settable intended location of the BAN enabled object;
        iii. receive, using the radio communication interface circuitry, groupID from said communication device, when a groupID is created;
        iv. store, in a data storage, the received groupID.

10. The object according to claim 9, wherein the processing circuitry is further configured to transmit property data to the communication device.

11. The object according to claim any of claim 9, wherein said object comprises an electronic module.

12. The object according to claim 11, wherein said electronic module comprises said detector circuitry unit, said radio communication interface circuitry, said processing circuitry and said data storage.

13. The object according to claim 11, wherein said electronic module further comprises a battery.

14. A system comprising at least one Body Area Network, BAN, enabled object and a Body Area Network, BAN, enabled communication device, wherein said system is configured for grouping of said at least one BAN enabled object with said BAN enabled communication device, wherein said BAN enabled object comprises:
    detector unit circuitry configured for detecting the presence of a human body within a prescribed distance of the detector unit circuitry;
    radio communication interface circuitry configured to communicate with said BAN enabled communication device;
    a processing circuitry configured to:
        i. broadcast a signal, indicating an ability to group, when said detector unit circuitry detects the presence of a human body;
        ii. transmit identification data, objectID, and position data associated with the BAN enabled object to the BAN enabled communication device, when a request for objectID is received, wherein the position data comprises location data indicating a user-settable intended location of the BAN enabled object;

iii. receive, using the radio communication interface circuitry, groupID from said BAN enabled communication device, when a groupID is created;

iv. store, in a data storage, the received groupID.

* * * * *